United States Patent Office 2,875,207
Patented Feb. 24, 1959

2,875,207

PROCESS FOR THE PREPARATION OF VITAMIN B₆, INTERMEDIATES EMPLOYED THEREIN, AND PROCESSES OF PREPARING THE SAME

Niels Konrad Friedrich Wilhelm Clauson-Kaas, Maanedalen, Horsholm, and Niels Elming, Copenhagen, Denmark, assignors to Sadolin & Holmblad A/S, Copenhagen, Denmark, a corporation of Denmark No Drawing. Application May 2, 1958
Serial No. 732,431

Claims priority, application Denmark November 30, 1953

24 Claims. (Cl. 260—297.5)

The present invention relates to the preparation of vitamin $B_6$ and new compounds which serve as intermediates in the production of vitamin $B_6$.

This application is a continuation-in-part of our co-pending application S. N. 547,888, filed November 10, 1955, now abandoned, which is in turn a division of application S. N. 471,896, filed November 29, 1954, now Patent No. 2,806,852.

It is an object of the present invention to provide a method for preparing vitamin $B_6$.

It is a further object of the invention to provide novel intermediate compounds used in the preparation of vitamin $B_6$.

Another object of the invention is to provide methods for preparing the novel intermediate compounds.

Pyridoxine (vitamin $B_6$) has the formula:

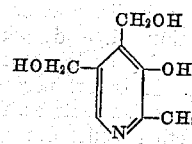

The starting point for its synthesis according to the present method is a known furan having the general formula

in which $R_1$ and $R_2$ each represents a free or functionally converted carboxyl group.

The principal steps involved in the new method, starting with this material, may be outlined as follows:

(1) The starting furan is reduced to 3,4-bis(hydroxymethyl) furan with a suitable reducing agent, which will reduce the side chains without a simultaneous reduction of the furan ring, and preferably esterified to form the corresponding diester to protect the carbinol group in subsequent reactions.

(2) An acetyl group is introduced in the 2-position by reacting with acetic anhydride in the presence of a catalyst for reactions of the Friedel-Crafts type to form a diester of 2-acetyl-3,4-bis(hydroxymethyl)-furan.

(3) A 2-(α-amino or α-acylamidoethyl)-3,4-bis(hydroxymethyl or acyloxymethyl)-furan is prepared either directly by reductive amination of a compound formed by step (2), for example, by reduction with gaseous hydrogen in methanol in the presence of Raney nickel and ammonia, followed by acylation, if desired, or by a two-stage process wherein the oxime is first formed by reacting with hydroxylamine or a salt thereof with the oxime being hydrogenated in the presence of a catalyst, such as Raney nickel, the reaction being carried out in the presence of a carboxylic acid anhydride if the acyl derivative is desired.

(4) A compound formed by step (3) is oxidized to form a dihydrofuran having the general formula $XR_1$ in which X is a group of the general formula

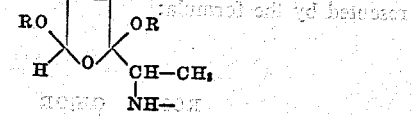

in which Y is a $CH_2OR_1$ group, $R_1$ being hydrogen or an acyl group, or in which Y is a group that can be converted to a —$CH_2OH$ group and in which R is an alkyl, hydroxyalkyl, alkoxyalkyl, or cycloalkyl group of not more than 6 carbon atoms, for example a methyl, ethyl, hydroxyethyl, 2-methoxyethyl, 2-ethoxyethyl or cyclohexyl group. The oxidation is carried out with the starting material in solution in a monohydric alcohol of the formula ROH in which R has the same meaning as above and may be carried out electrolytically in the presence of an electrolyte, which is soluble in the alcohol employed or it may be carried out chemically by treating a solution of the starting material in an alcohol with chlorine or bromine at a low temperature. The oxidized product may be saponified in alkaline medium to yield in all cases the desired 2-(α-aminoethyl)-3,4-bis(hydroxymethyl)-2,5-dialkoxy-2,5-dihydrofuran.

(5) The dihydrofurans of step (4), whether subjected to saponification or not, are subjected to hydrolysis in an acid or neutral medium to yield pyridoxine (vitamin $B_6$), the furan ring being opened and the pyridine ring formed by intramolecular condensation. When saponification is omitted, however, a less pure product results.

It has been found that pyridoxine can be prepared by alternative procedures involving steps (4) and (5), which will be explained fully hereinafter. In one such procedure the oxidation product of step (4) is not isolated but the reaction mixture is subjected directly to acid hydrolysis to yield pyridoxine and in another modification, the oxidation step is carried out in aqueous alcohol solution to yield pyridoxine directly.

The following equations illustrate one embodiment of the process in its entirety, but are not to be considered as limiting the invention in any manner:

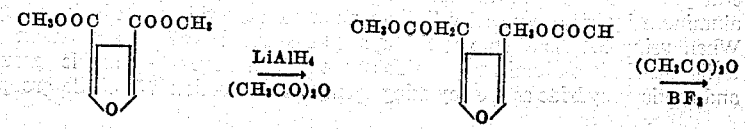

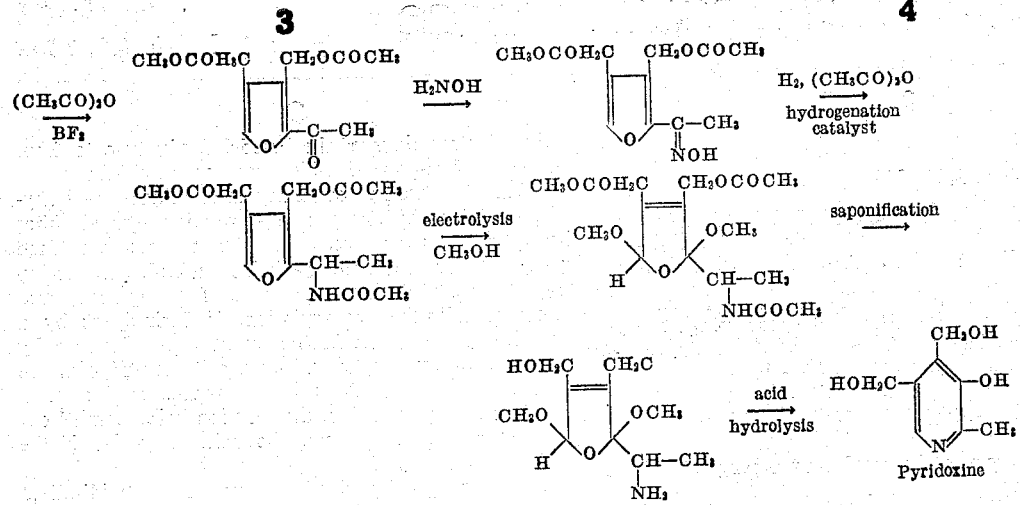

The individual steps of the process, certain of which yield novel compounds, will now be described in detail.

PREPARATION OF 3,4-BIS(HYDROXYMETHYL)-FURAN AND ITS DIESTERS 3,4-bis(hydroxymethyl)furan and its diesters are represented by the formula:

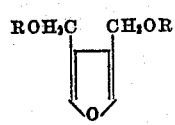

in which R represents hydrogen or an acyl group.

The method according to the invention comprises reducing a furan having the general formula

in which $R_1$ and $R_2$ each represents a free or functionally converted carboxyl group, such as an acid halide group, e. g. an acid chloride group, a carbalkoxy group, e. g. a carbethoxy group, a nitrile group, or together form an inner anhydride. The expression "inner anhydride" means that $R_1$ and $R_2$ are carboxyl groups which together form an anhydride.

In carrying out the method according to the invention, it is very convenient to use as the starting material the 3,4-dicarbalkoxy furans produced for the first time by Alder and Rickert (Berichte der deutschen chemischen Gesellschaft, vol. 70, 1937, page 1354) who used furan and esters of acetylene dicarboxylic acid, e. g. the diethylester. Instead of these esters it is also possible to use with good results the free acids or the inner anhydride, the acid halide, e. g. the acid chloride, or the corresponding nitrile.

The reduction of the 3,4-disubstituted furan is preferably carried out with an alkali or alkaline earth metal aluminum hydride, especially lithium aluminum hydride. When using 3,4-dicarbethoxy furan as the starting material and lithium aluminum hydride as the reducing agent and acetic anhydride as the acylating agent, the production of the diacetic ester of 3,4-bis(hydroxymethyl)-furan can be illustrated by the following scheme of reaction

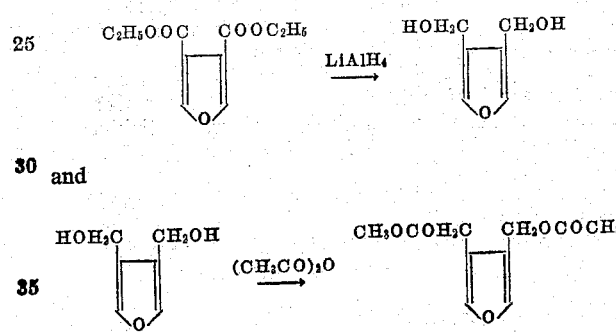

The reduction with lithium aluminum hydride may be carried out by adding dropwise a solution of the 3,4-disubstituted furan in anhydrous ether to an ether solution of lithium aluminum hydride with stirring and reflux cooling for returning of the ether which vaporizes during the reaction. It is not necessary to use ether as the solvent and other solvents as, for example, tetrahydrofuran or dimethyl cellosolve (dimethoxyethane) may also be used. The reduction should be carried out at a temperature between room temperature and about 120° C. for from a few minutes to several hours, depending on the starting material used and the boiling point of the solvent.

Since the diester of the product formed by the reduction, i. e. 3,4-bis(hydroxymethyl)-furan has been found especially suitable for the production of pyridoxine, the 3,4-bis(hydroxymethyl)-furan is preferably directly esterified, which can be accomplished without prior isolation of the product of reduction by addition of an acylating agent, such as an acid anhydride, e. g. acetic anhydride, or an acid halide, e. g. acetyl chloride or the ketenes, corresponding to the acids in question, e. g. ketene itself. It is also possible to produce in the same way other esters than the diacetic esters, e. g. the propionic, butyric, benzoic or substituted benzoic ester.

Instead of using lithium aluminum hydride, the reduction can be carried out in a different manner. Starting with a compound having the above-mentioned formula, in which $R_1$ and $R_2$ are acid halide groups, e. g. acid chloride groups, the reduction can be performed catalytically or by using a boron hydride, e. g. sodium boron hydride. If the compound used as the starting material contains nitrile groups in the 3,4-position, these nitrile groups, for example, having been obtained by conversion of the esterified carboxylic groups to acid amide groups followed by splitting off water, these nitrile groups can be reduced to the corresponding amino groups either catalytically or using lithium aluminum hydride, the amino groups after diazotization being converted to hydroxymethyl groups.

The invention is further illustrated by the following examples:

Example 1.—3.18 g. (0.015 mol) of 3,4-dicarbethoxy furan are dissolved in 15 mls. of dry ether. The solution is added dropwise with stirring during 10 minutes to a solution of 0.69 gms. (0.018 mol) of lithium aluminum hydride in 20 mls. of dry ether. After the addition, the mixture is left standing for 5 minutes with continued stirring, and then 20 mls. of acetic anhydride are added slowly with stirring during 5 minutes. The reaction mixture is then heated on an oil bath, the temperature of which is gradually raised to 110° C., whereby the ether distills off. After that, the heating is continued for 3 hours, the temperature of the oil bath being kept at 115–120° C. The reaction mixture is then cooled, 40 mls. of ether are added, the mixture is filtered, and the ether is distilled from the filtrate. The residue is distilled in vacuo, yielding 2.63 gms. (corresponding to 83% of the theoretical yield) of 3,4-bis(acetoxymethyl)-furan as a colorless liquid which crystallizes on cooling. Its data are:

B. P. at 0.1 mm. of mercury, 88–90° C., $n_D^{25}=1.4672$. M. P. 29–31° C. (Hershberg app., corr.). $C_6H_6O_3(COCH_3)_2$ calc.: C 56.6%, H 5.7%, $COCH_3$ 40.6%. Found: C 56.9%, H 5.9%, $COCH_3$ 40.0%. After re-crystallization from ether, the melting point is 30–32° C.

Example 2.—30.0 g. of diethyl-3,4-furan dicarboxylate dissolved in 200 mls. of dry ether are added dropwise while stirring to 11.2 gms. of lithium aluminum hydride in 250 mls. of dry ether at such a rate as to produce gentle reflux. 5 minutes after the last addition, 20 mls. of water and then 200 mls. of 20% sodium hydroxide solution are added dropwise with continued stirring and with cooling. The mixture is extracted with ether, the ethereal extract dried with magnesium sulphate and the ether evaporated in vacuo, yielding 16.4 grams (corresponding to 90% of the theoretical yield) of a colorless liquid consisting of crude 3,4-bis(hydroxymethyl)-furan. By distillation in vacuo, pure 3,4-bis(hydroxymethyl)-furan is obtained, the B. P. of which at 0.1 mm. of mercury is 101–107° C., and the refractive index $n_D^{25}=1.5067$. $C_6H_8O_3$ calc.: C 56.2%, H 6.3%. Found: C 56.0%, H 6.6%.

Example 3.—15.4 gms. of crude 3,4-bis(hydroxymethyl)-furan, produced according to example 2, are dissolved in a mixture of 100 mls. of pyridine and 100 mls. of acetic anhydride, and the mixture is left standing at room temperature overnight. The solvent is then distilled off in vacuo, and on continued distillation in vacuo, 22.9 gms. of 3,4-bis(acetoxymethyl)-furan (corresponding to a yield of 90.3%) are obtained as a colorless liquid crystallizing totally on cooling.

Example 4.—3.18 gms. (0.015 mol) 3,4-dicarbethoxy furan in 15 mls. of dry methylal are added dropwise during 10 minutes to a stirred mixture of 0.69 gm. (0.018 mol) of lithium aluminum hydride and 20 mls. of methylal. The stirring is continued for 5 minutes, and thereafter the methylal is removed by distillation (at least 90% recovery) with stirring in vacuo on a water bath having a temperature of 60 to 80° C. A dry, white powder is obtained as a residue. After cooling 20 mls. acetic anhydride are added dropwise with stirring during 5 minutes and then the mixture is heated 3 hours on an oil bath (115 to 120° C.) with continued, efficient stirring. After cooling 40 mls. of ether are added and the mixture is filtered (G3 filter) and distilled. The yield is 2.51 gms. (79%) of 3,4-bis(acetoxymethyl)-furan having the B. P. 99–101° C. at 0.2 mm. of mercury and $n_D^{25}=1.4672$. On cooling the product crystallized completely; the whole product remains crystalline on storing at 25° C.

Example 5.—31.8 gms. (0.15 mol) of 3,4-dicarbethoxy-furan in 150 mls. of dimethylcellosolve (technical product, distilled and dried over sodium wire) are added dropwise during 45 minutes to a stirred mixture of 6.90 gms. (0.18 mol) of lithium aluminum hydride and 200 mls. of dimethyl Cellosolve. The temperature is kept at 65–70° C. by cooling now and then. After the addition the mixture is kept at said temperature during 5 minutes. The solvent is distilled off (at least 90% recovery) with stirring in vacuo on a water bath of 60° C. A dry, white residue is obtained. After cooling 200 mls. of acetic anhydride are added in one portion with stirring, whereafter the mixture is heated for 3 hours on an oil bath (115–120° C.) with continued efficient stirring. After cooling there are added to the mixture 200 mls. of benzene and then the mixture is filtered (G4 filter). When the main amount of the liquid has passed the filter the filtering becomes slower in a substantial degree. The mass on the filter is therefore effectively stirred with 100 mls. of benzene and the mixture is centrifuged. The deposit is washed by stirring with 100 mls. of benzene and the mixture is again centrifuged. The filtrate and the combined extracts are distilled from an oil bath. The yield is 25.4 gms. (80%) of 3,4-bis(acetoxymethyl)-furan having the B. P. 96–103° C. at 0.1 mm. of mercury and $n_D^{25}=1.4669$. On cooling, the product crystallizes completely; the whole product remains crystalline on storing at 25° C.

PREPARATION OF 2-ACETYL-3,4-BIS(HYDROXYMETHYL)FURAN AND ITS DIESTERS 2-acetyl-3,4-bis(hydroxymethyl)furan and its diesters are represented by the formula:

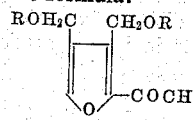

wherein R represents hydrogen or acyl groups.

The compounds are formed by reacting 3,4-bis-(hydroxymethyl)-furan or an ester thereof with an acetylating agent, for example, acetic anhydride or an acetyl halide, preferably in the presence of a catalyst which improves reactions of the Friedel-Crafts type. If the non-esterified 2-acetyl-3,4-bis(hydroxymethyl)-furan is to be produced, those acid radicals with which the hydroxymethyl groups are esterified are split off.

Starting from 3,4-bis(hydroxymethyl)-furan there is obtained by reaction with acetic acid anhydride or acetyl halide, for example, acetyl chloride, preferably in the presence of a catalyst of the kind indicated, 2-acetyl-3,4-bis(acetoxymethyl) - furan. Various 3,4 - bis(acyloxymethyl)-furans may be employed as the starting material and different final products can be obtained depending on the acyl group with which the two hydroxy-methyl groups are esterified. Acetyl, butyryl, benzoyl, or substituted benzoyl groups are especially useful.

As catalysts for improving reactions of the Friedel-Crafts type which may be used for introducing the acetyl group into the 2-position in the furan ring, strong acids such as hydriodic, are preferably used, or there may be employed the so-called Lewis acids, for example, stannic chloride, ferric chloride, titanium tetrachloride or preferably boron trifluoride or an organic boron trifluoride complex, such as boron trifluoride etherate or boron trifluoride-acetic acid complex. If the production of 2-acetyl-3,4-bis(hydroxymethyl)-furan is desired, the acyl groups with which the hydroxy methyl groups in 3- and 4-positions in the furan ring are esterified, are split off after the acetylation.

The reaction is preferably carried out with the acetylation agent, for example, acetic acid anhydride, as a solvent. Other solvents may also be used, for example, ether or benzene. The time of reaction depends upon the temperature used. Usually the reaction is allowed to proceed without heating in the beginning, whereafter the reaction mixture is heated to about 90–100° C. in order to complete the reaction. The time of reaction usually amounts to a quarter of an hour or more. When the reaction has been completed, a small amount of water is added and the reaction mixture is extracted with a suitable solvent, for example, ether or benzene, after which the extract is washed and the solvent is evaporated. The residue which is the desired product can be purified by redistillation.

The invention is illustrated by the following examples:

*Example 6.*—22 g. of 3,4-bis(acetoxymethyl)furan are dissolved in 25 ml. of acetic anhydride, and a solution of 1.3 ml. of boron fluoride etherate in 20 ml. of acetic anhydride is added in one portion with stirring. The temperature rises to 40° C., and the mixture is further heated to 85–90° C. and kept at this temperature for about 10 minuutes. After cooling, 40 ml. of water are added, and stirring continues for 10 minutes. The dark-brown mixture is extracted with 80 ml. of ether and again with 50 ml. of ether. The etheral extracts are joined and washed with water, with a 2-molar solution of potassium hydrogen carbonate, and again with water. After drying and distillation, 18.9 g. (corresponding to a yield of 72%) of 2-acetyl-3,4-bis(acetoxymethyl) furan are recovered as an almost colorless liquid with B. P. 0.1=127–129° C., which solidifies on cooling. The melting point is 48–51° C.

$C_8H_8O_4(COCH_3)_2$ calc.: C 56.7%, H 5.6%, $COCH_3$ 33.9%. Found: C 56.9%, H 6.0%, $COCH_3$ 32.2%.

On crystallization from ether, the melting point rises to 51–53° C.

2-acetyl-3,4-bis(hydroxymethyl)furan and its diesters can also be prepared without isolating 3,4-bis(hydroxymethyl)furan or its diesters from the reaction described earlier, which results in its preparation. For example, 2-acetyl-3,4-bis(acetoxymethyl)furan may be prepared, as follows:

*Example 7.*—2820 g. of 3,4-dicarbethoxyfuran are dissolved in 13 l. of dry ether, and the solution is added in small portions to a stirred solution of 610 g. of lithium aluminum hydride in 18 l. of dry ether. After the addition, stirring is continued for 5 minutes, and then 18 l. of acetic anhydride are added. The reaction vessel is placed in an oil bath, the temperature of which is gradually raised to 110° C. whereby the ether distills, the distillation is interrupted by cooling the reaction vessel when the remainder weighs about 5,000 g. without isolating the 3,4-bis(acetoxymethyl)furan. A solution of 140 ml. of boron fluoride etherate in 2000 g. of acetic anhydride is added in one portion with stirring. The mixture is then heated to 85–90° C. and maintained at this temperature for 10 minutes. After cooling, 4 liters of water are added, and stirring is continued for 10 minutes. The dark-brown mixture is extracted with 8 liters and then with 5 liters of ether. The etheral extracts are joined and washed with water, 2-molar potassium hydrogen carbonate, and again with water and then dried.

The residue might be used directly in the step of the process to be described next, but is preferably distilled for purification purposes, yielding 2000 g. (72%) of 2-acetyl-3,4-bis-(acetoxymethyl)furan as an almost colorless liquid, B. P. 0.1, 127–219° C., M. P. 48–51° C.

PREPARATION OF 2-(α-AMINO OR α-ACYLAMIDO-ETHYL)-3,4-BIS(HYDROXYMETHYL OR ACYLOXYMETHYL)-FURANS

The present new compounds correspond to the following general formula:

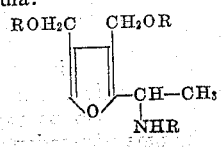

in which R represents hydrogen or an acyl group. The acyl groups may be derived from various organic acids, suitable such groups being acetyl, propionyl, butyryl, benzoyl and substituted benzoyl groups.

As a starting material for producing the new compounds 2 - acetyl - 3,4 - bis(hydroxymethyl)-furan or its esters, the preparation of which was described above, are used. The process of the invention comprises converting the keto group in α-position in the substituent in 2-position in the furan ring to a $CHNH_2$-group or CHNH-acyl-group. This can, for example, be carried out by reductive amination, for example, by reduction with gaseous hydrogen in methanol in the presence of Raney nickel and ammonia, preferably under a pressure of 100–200 atmospheres and a temperature of 120–175° C. The reductive amination may also be carried out by employing ammonium formiate (Leuckart's reaction).

The reductive amination with $NH_3$, Raney nickel and hydrogen gas in methanol can be illustrated by the following scheme of reactions:

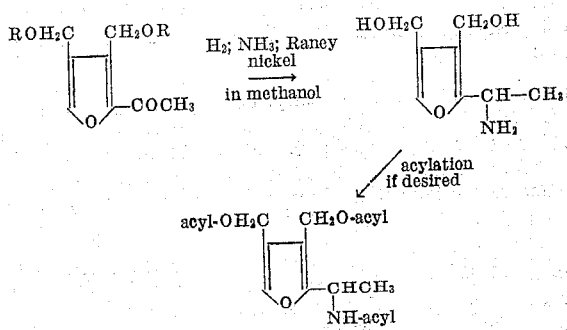

Thus, in the first case, it is possible in one step to obtain directly the desired 2-(α-amino ethyl)-3,4-bis(hydroxymethyl)-furan. Also in the other case, when ammonium formiate is used, there is obtained the desired product in a single step, a hydrogen atom in the $NH_2$ group being, however, substituted by a formyl group.

The same favorable results are obtained by a two-step process for converting the keto group into a $CHNH_2$ group. In this case the ketone is first converted into the corresponding oxime by reaction with hydroxylamine or a salt thereof, for example, hydroxylamine hydrochloride, after which the oxime is reduced to the corresponding amine, preferably catalytically, for example, by means of gaseous hydrogen in the presence of Raney nickel. Thereby the acyl amido compound is obtained immediately, if the reduction is carried out in a solvent consisting of an acid anhydride.

The conversion of the ketone to the oxime is carried out in the usual way, that is, by adding hydroxylamine or its salt to a solution of the ketone in a suitable solvent, for example, methanol or ethanol, in the presence of a neutralizing agent, for example, potassium or sodiumacetate which binds the acid formed. The oxime thus obtained is preferably isolated, whereafter it is hydrogenated, preferably catalytically, using for example, Raney nickel as a catalyst. The reaction is carried out in an acid anhydride, preferably acetic acid anhydride, with gaseous hydrogen having a pressure of 80–120 atmospheres, preferably about 100 atmospheres, at a temperature of 60–100° C., preferably 70–80° C. Under these conditions the reduction of the oxime usually takes about one hour. After evaporation of the solvent, the residue which consists of the desired 2-(acylamido ethyl)-3,4-bis(acyloxymethyl)-furan, can be crystallized for example, from ether. The product can be recrystallized from a benzene-ether mixture.

The described modification of the process which is carried out in two steps can be illustrated by the following scheme of reactions:

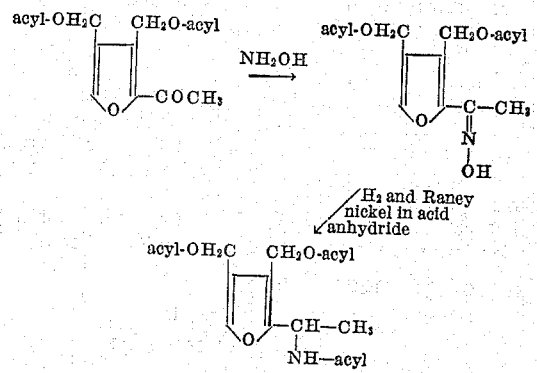

The invention is more particularly illustrated by the following examples:

*Example 8.*—10.0 gms. of 2-acetyl-3,4-bis(acetoxymethyl)-furan, 50 mls. of methanol, 0.8 gm. of Raney nickel and 24 mls. of liquid ammonia were mixed and were then shaken for one hour under gaseous hydrogen and a pressure of 150 atmospheres at 145–165° C. The light yellow reaction mixture was filtered and evaporated to dryness in vacuo on a water bath. Distillation (from an oil bath) of the residue gave 66% of 2-($\alpha$-aminoethyl)-3,4-bis(hydroxymethyl)-furan as a pale yellow liquid having the B. P. 172–188° C. at 0.09–0.1 mm. of mercury and having $n_D^{25}=1.5285$.

$C_8H_{13}O_3N$ calc.: C 56.1%, H 7.7%, N 8.2%. Found: C 56.6%, H 7.9%, N 8.0%.

*Example 9.*—5.0 gms. of 2-acetyl-3,4-bis(acetoxymethyl)-furan, 30 mls. of methanol, 24 mls. of liquid ammonia, and 0.4 gm. of Raney nickel were mixed and shaken for one hour under gaseous hydrogen and a pressure of 150 atmospheres at 145–165° C. The light yellow reaction mixture was filtered and evaporated to dryness in vacuum on a water bath. The residue was refluxed 30 minutes with 20 mls. of acetic anhydride, whereafter the brown solution was distilled from an oil bath. The yield was 4.78 gms. of 2-($\alpha$-acetamidoethyl)-3,4-bis(acetoxymethyl)-furan, obtained as an almost colorless oil having the B. P. 175–187° C. at 0.05 mm. of mercury and having $n_D^{25}=1.4905$.

$C_8H_{10}O_3N(CH_3CO)_3$ calc.: C 56.6%, H 6.4%, N 4.7%, $CH_3CO$ 43.4%. Found: C 56.6%, H 6.5%, N 4.7%, $CH_3CO$ 44.7%.

The product crystallized on storing and had the melting point 85–89° C. (Hershberg app., corr.) On crystallizing from ether there was obtained in an 88% yield a product, melting at 93° C.

*Example 10.*—18.5 gms. of 2-acetyl-3,4-bis(acetoxymethyl)-furan were mixed with 8.2 gms. of anhydrous sodium acetate and 6.2 gms. of hydroxylamine hydrochloride, whereafter the mixture was refluxed for 5 hours. The hot mixture was filtered and the ethanol was distilled off in vacuum. The residue was an almost colorless liquid, which after addition of water and cooling crystallized to a white solid. After filtration, washing with water and drying 2-acetyl-3,4-bis(acetoxymethyl)-furanoxime was obtained in a yield of 17.6 gms. corresponding to 90% of the theoretical yield. The product melted at 78–81° C. After recrystallization from ether the melting point was 79–81° C.

$C_8H_9O_4N(COCH_3)_2$ calc.: C 53.5%, H 5.6%, N 5.12%, $COCH_3$ 32.0. Found: C 53.6%, H 5.9%, N 5.4%, $COCH_3$ 32.4%.

2.5 gms. of the 2-acetyl-3,4-bis(acetoxymethyl)-furan-oxime obtained and 20 mls. of acetic acid anhydride were shaken for one hour with 0.4 gm. of Raney nickel under gaseous hydrogen at a pressure of 100 atmospheres and a temperature of 70–80° C. The reaction mixture was filtered and the solvent was evaporated finally at 0.1 mm. of mercury and 60–70° C. The residue was thereafter shaken with 20 mls. of anhydrous ether, white crystals being thereby formed. About 10 mls. of the ether were evaporated, whereafter the crystals were filtered off, washed twice with ether and dried. The yield amounted to 2.52 gms. (91%) of 2-($\alpha$-acetamidoethyl)-3,4-bis-(acetoxymethyl)-furan melting at 92.94° C. After recrystallization from a mixture of ether and benzene the melting point of the product was 95–96° C.

$C_8H_{10}O_3N(COCH_3)_3$ calc.: C 56.6%, H 6.4%, N 4.7%, $COCH_3$ 43.4%. Found: C 56.3%, H 6.4%, N 4.5%, $COCH_3$ 42.5%.

When isolating the reaction product through distillation a pale yellow liquid was obtained, the yield being 79%. This liquid boiled at 170–190° C. at about 0.1 mm. of mercury. After storing for a few days the liquid crystallized and when recrystallized from ether, white crystals were obtained with a melting point of 65–68° C. The result of the analysis of these crystals was: C—56.5%, H—6.6%, N—4.7%, $COCH_3$—42.4%.

These crystals were easily soluble in ether but on seeding with crystals having the melting point 95–96° C. crystals were formed in the ether solution which also melted at 95–96° C. and were only slightly soluble in ether. Therefore, it is obvious that the compound crystallizes in two forms, that having the higher melting point being that which is usually obtained.

*Example 11.*—2.97 gms. 2-($\alpha$-acetamidoethyl)-3,4-bis-(acetoxymethyl)-furan, obtained as described in Examples 9 and 10, were refluxed for 24 hours in a solution of 4 gms. of sodium hydroxide in 100 mls. of ethyl alcohol. Most of the alcohol was evaporated in vacuum and 100 mls. of water were added to the residue. The resulting solution was extracted with ether. The ethereal layer was evaporated leaving an oily residue consisting of 2-($\alpha$-aminoethyl)-3,4-bis(hydroxymethyl)-furan. Yield 1.6 gms.

For a later conversion of the 2-($\alpha$-aminoethyl)-3,4-bis(hydroxymethyl)-furan produced according to the invention to vitamin $B_6$ the amino group and the hydroxy group can be protected in a well-known manner, for example, by acylation or by conversion to the corresponding carbamate, mono- or diureide.

It will also be understood that, if desired, the free amine having the formula:

in which R has the above-stated meaning, may be converted to an acid addition salt. It is preferred that the addition salt be that of a mineral acid such as hydrochloric acid, sulfuric acid, nitric acid, or phosphoric acid, with the hydrochloride being particularly preferred. However, the acid addition salts of strong organic acids may also be prepared, and as examples of such salts may be mentioned those of oxalic acid and picric acid.

For purposes of illustration, there is set forth the following example which discloses the production of the hydrochloride of 2-($\alpha$-aminoethyl)-3,4-bis-(hydroxymethyl)-furan:

*Example 12.*—1.0 mole (171.19 g.) of 2-($\alpha$-aminoethyl)-3,4-bis-(hydroxymethyl)-furan is made up to 800 mls. with absolute n-butanol. A glass electrode is inserted showing an apparent pH of 9 to 10.5.

The solution is then agitated and kept at room temperature (20–35° C.) while butanolic hydrochloric acid is added over a period of about five minutes. The pH will drop rapidly to pH 8.0, then more slowly to pH 6.5 followed by a very rapid drop to below pH 3. During the latter period the addition of the butanolic hydrochloric acid is slowed down in order to reach a final pH of 2.5 to 2.0. Overacidification leads to darker crystals due to decomposition in extremely acidic medium of unprecipitated byproducts. The first crystals of 2-(α-aminoethyl)-3,4-bis-(hydroxymethyl)-furan hydrochloride will appear when an apparent pH of 7.0 is reached.

After complete acidification the solution is chilled off one hour to about 5° C. The precipitate is filtered off, washed with 150 mls. of fresh anhydrous butanol and dried in vacuo for two hours at 80–100° C., off-white colored crystals being obtained in a yield of about 80%. The product, which has a melting point of 166° C., is very pure in the form obtained and need not be recrystallized.

$C_8H_{13}O_3N$, HCl found: C 46.3%, H 6.8%, N 6.75%, Cl 17.1%. Calc.: C 46.2%, H 6.8%, N 6.75%, Cl 17.1%.

PREPARATION OF 2-(α-AMINOETHYL)-3,4-BIS-(HYDROXYMETHYL)-2,5-DIALKOXY-2,5-DIHYDROFURANS AND ACYLATED DERIVATIVES THEREOF 2-(α-aminoethyl)-3,4-bis(hydroxymethyl)-2,5-dialkoxy-2,5-dihydrofurans and acylated compounds thereof may be represented by the following general formula:

in which X is a group of the general formula:

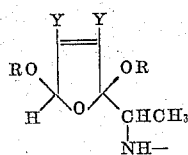

in which Y is a $CH_2OR_1$ group, $R_1$ being hydrogen or an acyl group, or in which Y is a group that can be converted to a $CH_2OH$ group, for instance a $CH_2NH_2$ group, and in which R is an alkyl, hydroxyalkyl, alkoxyalkyl or cycloalkyl group of not more than 6 carbon atoms, for instance a methyl, ethyl, hydroxyethyl, 2-methoxyethyl-, 2-ethoxyethyl or cyclohexyl group.

The group $R_1$ is preferably an acetyl group but may also be another acyl group which is usually employed in organic syntheses to protect alcoholic or amino groups, as for instance a propionyl or butyryl group.

The compounds are obtained if a 2-(α-acylamidoethyl)-3,4-bis(hydroxy- or acyloxymethyl)-furan prepared as described above is oxidized in solution in a preferably monohydric alcohol of the formula ROH in which R has the same meaning as above, whereupon, if desired, the acylated dihydrofuran compound or compounds obtained by said oxidation are saponified in an alkaline medium.

According to one embodiment of the invention, the oxidation which brings about an addition of one alkoxy group at the carbon atom in 2-position and of one alkoxy group at the carbon atom in 5-position of the furan ring is carried out electrolytically in the presence of an electrolyte which is soluble in the alcohol employed, such as for instance ammonium bromide, lithium bromide, a mixture of these two, sulfuric acid, boron trifluoride or an organic boron trifluoride complex such as boron trifluoride etherate or boron trifluoride acetic acid complex, a nitrate, a thiocyanate or a formate. The electrolyte may also be an organic halogen salt, for instance morpholine hydrobromide.

The alcohol used in the electrolysis is preferably methanol, as the aforesaid electrolytes are readily soluble in methanol and the electrolysis runs smoothly and at a satisfactory rate when carried out in this alcohol. However, good results are obtained also with for instance ethanol, 2-ethoxy ethanol, etc.

The electrolysis is carried out in a manner known per se, for instance, using the apparatus described in Acta Chem. Scan. 6, 1952, page 531, or using the apparatus described in Acta Chem. Scand. 7, 1953, page 234.

The electrolysis should be carried out at a temperature of between 0° and −30° C., preferably at about −15° C. As a rule, a terminal voltage of about 3 to 20 volts is sufficient. The current strength may vary within wide limits depending on the desired oxidation rate. This is due to the fact that the starting materials used according to the invention are comparatively stable. However, the current strength should preferably lie within the range of from 0.1 to 10 amperes.

The electrolysis and saponification may be illustrated by for instance the following scheme of reactions:

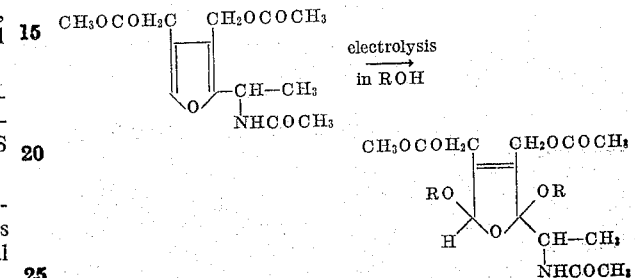

in admixture with

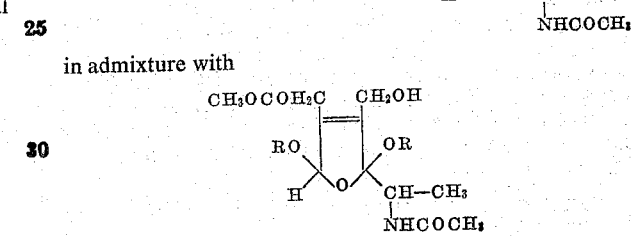

and

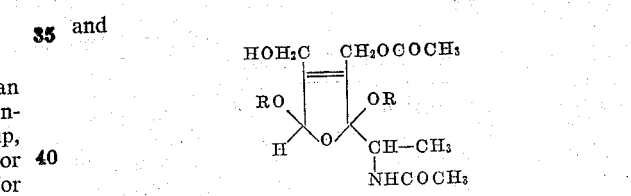

and

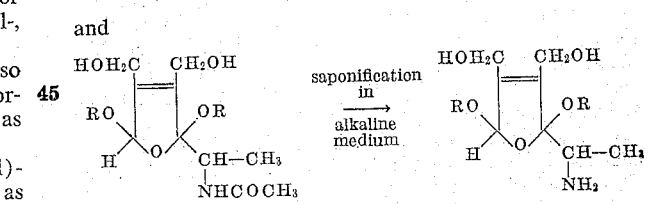

in which R has the same meaning as above.

Thus, in the above-mentioned case, the reaction mixture obtained after the electrolysis will consist of a mixture of the compounds 2-(α-acetamidoethyl)-3,4-bis(acetoxymethyl)-2,5-dialkoxy-2,5-dihydrofuran, 2-(α-acetamidoethyl)-3-acetoxymethyl-4-hydroxymethyl-2,5-dialkoxy-2,5-dihydrofuran, 2-(α-acetamidoethyl)-3-hydroxymethyl-4-acetoxymethyl-2,5-dialkoxy-2,5-dihydrofuran, and 2-(α-acetamidoethyl)-3,4-bis(hydroxymethyl)2,5-dialkoxy-2,5-dihydrofuran, as one or both acetyl groups in the 3 and 4 positions can be split off by alcoholysis during the electrolysis. However, when subsequently saponified all these four compounds will give the desired 2-(α-aminoethyl)-3,4-bis(hydroxymethyl)-2,5-dialkoxy-2,5-dihydrofuran.

According to another embodiment of the invention, the oxidation, i. e. the introduction of alkoxy groups in the 2,5-positions to form a 2,5-dihydrofuran, may be carried out with chlorine or bromine in an alcohol. Thus, when 2-(α-acylamidoethyl)-3,4-bis(hydroxy or acyloxymethyl)-furan is used in a solution in an anhydrous alcohol, preferably methanol, the oxidation may be performed with chlorine or bromine at a low temperature, for instance −10 to −80° C., with a simultaneous or subsequent addition of a neutralizing agent, such as for instance potassium or sodium acetate, for a period of a few minutes to half an hour or more.

If 2-(α-acylamidoethyl)-3,4-bis(acyloxymethyl)-furan is employed, the process may also be carried out in the following way: At first the 3,4-acyl groups are split off, for instance with sodium or potassium methoxide or ethoxide; the solution (in for instance methanol) will then contain 2-(α-acylamidoethyl)-3,4-bis(hydroxymethyl)-furan and the neutralizing agent (for instance sodium acetate) required for the acid formed later on during the oxidation. Then the oxidation is carried out with chlorine or bromine in the manner described above. The dihydrofurans thus formed are subsequently saponified to form the desired 2-(α-aminoethyl)-3,4-bis(hydroxymethyl)-2,5-dialkoxy-2,5-dihydrofuran.

The invention is illustrated further by the following examples:

*Example 13.*—2.50 gms. of 2-(α-acetamidoethyl)-3,4-bis(acetoxymethyl)-furan and 0.30 gm. ammonium bromide are dissolved in 20 mls. methanol, whereupon the solution is electrolysed in an apparatus of the type described in Acta Chem. Scand. 7 (1953), page 234, the temperature of the cooling bath being maintained at −21° C. The electrolysis is carried out at 0.7 to 0.5 ampere and at a terminal voltage of 6.2 to 6.5 volts and consumes 0.50 ampere-hour which corresponds to about 110% of the theoretical consumption.

After the electrolysis, the electrolyte is poured into a solution of sodium methylate (0.458 gm. sodium in 5 mls. methanol), whereupon the methanol and the ammonia are evaporated in vacuo. The evaporation residue consists of a mixture of 2-(α-acetamidoethyl)-3,4-bis(acetoxymethyl)-2,5-dimethoxy-2,5-dihydrofuran, 2 - (α-acetamidoethyl)-3-hydroxymethyl - 4 - acetoxymethyl-2,5-dimethoxy-2,5-dihydrofuran, 2-(α-acetamidoethyl)-3-acetoxymethyl-4-hydroxy methyl-2,5-dimethoxy-2,5-dihydrofuran, and 2-(α-acetamidoethyl)-3,4-bis(hydroxymethyl)-2,5-dimethoxy-2,5-dihydrofuran. To the residue thus obtained are added 8.5 mls. of 3-N sodium hydroxide, whereupon the mixture is refluxed for 21 hours and is then continuously extracted with ether for 48 hours. The ether extracts are evaporated in vacuo to form an oily residue which consists of 2-(α-aminoethyl)-3,4-bis-hydroxymethyl)-2,5-dimethoxy-2,5-dihydrofuran.

*Example 14.*—2.50 g. of 2-(α-acetamidoethyl)-3,4-bis(acetoxymethyl)-furan were electrolyzed according to Example 13 but at a lower current density. The current strength employed was 0.24 to 0.16 ampere and the terminal voltage was 4.0–4.2 volts. The reaction mixture was treated in the same manner as in Example 13 and gave a similar oil consisting of 2-(α-aminoethyl)-3,4-bis-(hydroxymethyl)-2,5-dimethoxy-2,5-dihydrofuran.

*Example 15.*—This experiment was carried out exactly in the same manner as described in Example 13, but at a higher current density, the current strength being 1.80 to 1.37 amperes and the terminal voltage being 10.2–10.6 volts. After a further treatment as described in Example 13, there was obtained an oil consisting of 2-(α-aminoethyl)-3,4-bis(hydroxymethyl) - 2,5 - dimethoxy-2,5-dihydrofuran.

*Example 16.*—A mixture of 18.75 g. (0.063 mol) of 2-(α-acetamidoethyl)-3,4-bis(acetoxymethyl)-furan, 4.00 g. ammonium bromide and 250 ml. methanol was electrolyzed as in Example 13, but in the apparatus described in Acta Chem. Scand. 6, 1952, page 531. The current strength employed was 3.30–2.50 amperes, the terminal voltage was 5.2–5.9 volts, and 3.70 ampere-hours were consumed which corresponds to 110% of the theoretical consumption. The reaction mixture was treated as described in Example 13 to give 2-(α-aminoethyl)-3,4-bis-(hydroxymethyl)-2,5-dimethoxy-2,5-dihydrofuran in the form of an oil.

*Example 17.*—2.55 g. (0.0086 mol) of 2-(α-acetamidoethyl)-3,4-bis(acetoxymethyl)-furan were dissolved in 15 ml. of anhydrous methanol. The mixture was cooled to −75° C., and a solution of 0.43 ml. (0.0086 mol.) bromine in 9 ml. anhydrous methanol was added within 5 minutes, with efficient stirring, at a temperature of from −60 to −70° C. Stirring was continued without cooling, which caused the temperature to rise to −40° C. A solution of 1.72 g. (0.018 mol) of potassium acetate in 9 ml. of anhydrous methanol was added, causing the temperature to rise to −30° C. The mixture was evaporated in vacuo, and to the residue there was added 200 ml. of anhydrous ether. After filtration the filtrate was evaporated in vacuo. The residue was treated as described in Example 13 to form an oily residue consisting of 2-(α-aminoethyl)-3,4-bis(hydroxymethyl)-2,5-dimethoxy-2,5-dihydrofuran.

*Example 18.*—2.55 g. (0.0086 mol) of 2-(α-acetamidoethyl)-3,4-bis(acetoxymethyl)-furan were mixed with a solution of sodium methoxide (produced from 0.415 g. (0.018 mol) of sodium in 11 ml. methanol). The mixture was refluxed overnight. Then, a solution of 72 mg. (0.0012 mol) acetic acid in 1 ml. methanol was added, and the solution was cooled to −20° C., whereupon it was treated with a solution of 0.43 ml. (0.0086 mol) of bromine in 9 ml. of methanol as described in Example 17. After an evaporation without any preceding ether treatment the residue obtained was treated directly as described in Example 13 and then yielded the same type of oil.

*Example 19.*—2.55 g. (0.0086 mol) of 2-(α-acetamidoethyl)-3,4-(acetoxymethyl)-furan and 1.72 g. (0.018 mol) of potassium acetate were dissolved in 11 ml. of anhydrous methanol. The mixture was cooled to −20° C., and a solution of 0.43 ml. (0.0086 mol) of bromine in 9 ml. of anhydrous methanol was added within 5 minutes, with efficient stirring, at a temperature of −20° C. The stirring was continued for 10 minutes, whereupon the mixture was evaporated in vacuo. To the residue were added 200 ml. ether, the resulting potassium bromide was removed by filtration, and the filtrate was evaporated in vacuo. To the residue was added a solution of 0.69 g. (0.017 mol) of sodium hydroxide in 8.6 ml. of 3-n sodium hydroxide (giving immediately a dark red color). The mixture was refluxed (20 hours) and then treated according to Example 13, producing an oily residue consisting of 2-(α-aminoethyl)-3,4-bis(hydroxymethyl)-2,5-dimethoxy-2,5-dihydrofuran.

PREPARATION OF PYRIDOXINE (VITAMIN $B_6$)

Pyridoxine (vitamin $B_6$) has the following configuration:

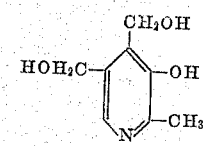

It has been found that this valuable compound may be readily synthesized from the compounds, the preparation of which was described in the preceding step and which have the general formula:

$$XR_1$$

in which X represents a group of the general formula:

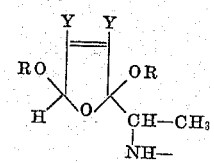

in which Y is a $CH_2OR_1$ group, $R_1$ being hydrogen or an acyl group, or Y is a group that may be converted to a $CH_2OH$ group, for instance, a $CH_2NH_2$ group, and in which R is an alkyl, hydroxyalkyl, alkoxyalkyl or cycloalkyl group having not more than 6 carbon atoms, for instance, a methyl, ethyl, hydroxyethyl, 2-methoxyethyl, 2-ethoxyethyl or cyclohexyl group. These compounds are subjected, if desired after a preceding saponification, to hydrolysis by storage or heating in a neutral or acid medium, a pyridine ring being formed due to condensation.

The starting material employed consists preferably of substituted furans of the aforesaid type in which R₁ represents hydrogen or an acetyl group. However, R₁ may also be any other acyl group which is usually employed to protect an alcoholic or amino group from undesirable reactions, such as a propionyl or butyryl group. It is also possible to protect the amino group and/or the alcoholic groups by converting them to the corresponding carbamate or mono- or diureid.

A suitable starting material is for instance 2-(α-acetamidoethyl)-3,4-bis(acetoxymethyl)-2,5-dimethoxy-2,5-dihydrofuran which may be produced according to the disclosure of the preceding step, which also mentions other compounds that are suitable as starting materials in the present process. The reactions performed with this starting material are illustrated by the following scheme of reactions:

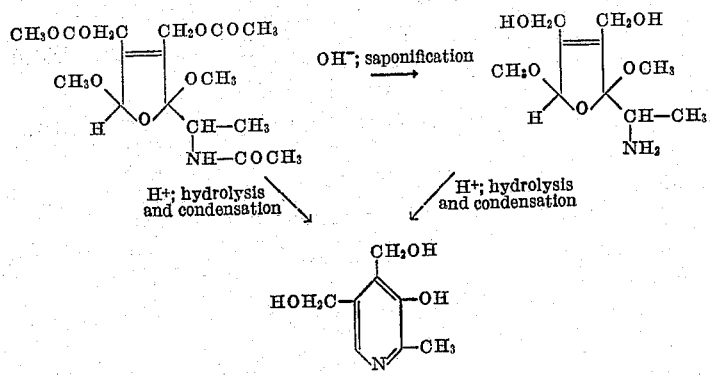

The reaction scheme shows that when an acid medium is used, pyridoxine may be obtained directly from the starting material without isolation of the amine formed as the intermediate product. This method, however, yields a less pure pyridoxine, and for this reason the starting material is preferably saponified to produce a 2-(α-aminoethyl)-3,4-bis(hydroxymethyl)-2,5-dialkoxy-2,5-dihydrofuran which may be isolated. On a subsequent hydrolysis in acid or neutral medium this compound gives pyridoxine. This reaction is preferably carried out by boiling with dilute inorganic acid such as hydrochloric acid, sulfuric acid or hydrobromic acid. However, the hydrolysis may also be performed, although at a lower rate, in the absence of an acid, i. e. by boiling a neutral solution of 2-(α-aminoethyl)-3,4-bis-(hydroxymethyl)-2,5-dialkoxy-2,5-dihydrofuran. Even when an acid solution of the compound is simply stored there will occur a hydrolysis with formation of a pyridine ring. However, in view of the fact that at higher temperatures (and in acid solution) the rate of hydrolysis is considerably higher, and the yield obtained is at least as high, it is usually most economical to carry out the hydrolysis by boiling with a dilute acid. A suitable acid concentration is from 0.5 to 2-N. After the boiling, the reaction product is evaporated to dryness and the evaporation residue is crystallized, for instance from ethanol, and thus, when hydrochloric acid is employed, there will be obtained pyridoxine hydrochloride in a yield of about 80-85% in the form of white crystals melting at 207-209° C.

The invention is illustrated by the following examples which, however, should not be considered limiting, since obvious modifications will be apparent to those skilled in the art:

*Example 20.*—2-(α-acetamidoethyl)-3,4-bis(acetoxymethyl)-2,5-dimethoxy-2,5-dihydrofuran is saponified to yield 2-(α-aminoethyl)-3,4-bis(hydroxymethyl)-2,5-dimethoxy-2,5-dihydrofuran. 18.0 g. of the latter compound are heated with reflux for 30 minutes with 150 ml. of 1-normal hydrochloric acid. The reaction mixture is then evaporated to dryness in vacuo, and the residue is crystallized from 99% ethanol, yielding 13.0 g. of pyridoxine hydrochloride, corresponding to 82%. The melting point is 207-209° C. and remains so when mixed with an authentic sample.

*Example 21.*—A mixture of 2-(α-acetamidoethyl)-3,4-bis(acetoxymethyl)-2,5-dimethoxy-2,5-dihydrofuran, 2-(α-acetamidoethyl)-3-acetoxymethyl-4-hydroxymethyl-2,5-dimethoxy-2,5-dihydrofuran, 2-(α-acetamidoethyl)-3-hydroxymethyl-4-acetoxymethyl-2,5-dimethoxy-2,5-dihydrofuran and 2-(α-acetamidoethyl)-3,4-bis(hydroxymethyl)-2,5-dimethoxy-2,5-dihydrofuran, obtained by electrolysis of 2.50 gm of 2-(α-acetamidoethyl)-3,4-bis(acetoxymethyl)-furan in an alcoholic solution in the presence of ammonium bromide as described in Example 13, is saponified by being boiled with 8.5 ml. of 3-N sodium hydroxide solution to form 2-(α-aminoethyl)-3,4-bis(hydroxymethyl)-2,5-dimethoxy-2,5-dihydrofuran. The alkaline solution is then extracted with ether, and the ether extract which contains 2-(α-aminoethyl)-3,4-bis(hydroxymethyl)-2,5-dimethoxy-2,5-dihydrofuran practically free from impurities is evaporated to dry condition. The residue is refluxed for 30 minutes with 15 ml. of 1-N hydrochloric acid. The reaction mixture is evaporated in vacuo, and the residue is recrystallized from 99% ethanol. In this way there will be obtained 1.31 gm. of pyridoxine hydrochloride, corresponding to a yield of 76%, calculated on the basis of the 2.50 gm. of 2-(α-acetamidoethyl)-3,4-bis(acetoxymethyl)-furan used for the oxidation. The hydrochloride melts at 207-209° C. and has still the same melting point when admixed with an authentic sample.

*Example 22.*—2-(α-aminoethyl)-3,4-bis(hydroxymethyl)-2,5-dimethoxy-2,5-dihydrofuran, obtained as an oil according to Example 14, was treated in the same manner as described in Example 21. The yield of pyridoxine hydrochloride was 1.12 gm. melting at 209-211° C. (decomposition) and 0.17 gm. melting at 206-208° C. (decomposition), the total yield thus being 1.29 gm. (75%).

*Example 23.*—2-(α-aminoethyl)-3,4-bis(hydroxymethyl)-2,5-dimethoxy-2,5-dihydrofuran, obtained as an oil according to Example 15 was treated in the same manner as described in the above Example 21. In this way were obtained 1.17 gm. of pyridoxine hydrochloride melting at 210-212° C. (decomposition) and 0.12 gm. melting at 208-210° C. (decomposition), the total yield thus being 1.29 gm. (75%).

*Example 24.*—2-(α-aminoethyl)-3,4-bis(hydroxymethyl)-2,5-dimethoxy-2,5-dihydrofuran, obtained as an oil according to Example 16 was treated as described in Example 21. In this way there were obtained 8.13 gm. of pyridoxine hydrochloride melting at 208-210° C. (decomposition) and 0.77 gm. melting at 205-207° C.

(decomposition), the total yield thus being 8.90 gm. (69%).

*Example 25.*—An oil of 2-(α-aminoethyl)-3,4-bis(hydroxymethyl)-2,5-dimethoxy-2,5-dihydrofuran, obtained according to Example 17 was treated as described in Example 21. Pyridoxine hydrochloride was obtained in a yield of 0.77 gm. melting at 206–208° C. (decomposition) and of 0.15 gm. melting at 204–207° C. (decomposition), the total yield thus being 0.92 gm. (52%).

*Example 26.*—2-(α-aminoethyl)-3,4-bis(hydroxymethyl)-2,5-dimethoxy-2,5-dihydrofuran, obtained as an oil according to Example 18 was treated in the manner described in Example 21. In this way pyridoxine hydrochloride was obtained in a yield of 0.22 gm. melting at 209–211° C. (decomposition) and of 0.06 gm. melting at 207–208° C. (decomposition), the total yield thus being 0.20 gm. (16%).

*Example 27.*—2-(α-aminoethyl)-3,4-bis(hydroxymethyl)-2,5-dimethoxy-2,5-dihydrofuran, obtained as an oily residue according to Example 19 was treated as described in Example 21. In this way there were obtained 0.55 gm. pyridoxine hydrochloride melting at 207–208° C. (decomposition) and 0.14 gm. melting at 205–207° C., i. e. in a total yield of 0.69 gm. (39%).

ALTERNATIVE PROCEDURES FOR PREPARATION OF PYRIDOXINE (VITAMIN $B_6$)

Pyridoxine (vitamin $B_6$) may be prepared from a 2-(α-aminoethyl or α-acylamidoethyl)-3,4-bis(hydroxy or acyloxy)-furan without isolating an intermediate product.

It will be recalled that pyridoxine may be prepared by the following scheme of reactions:

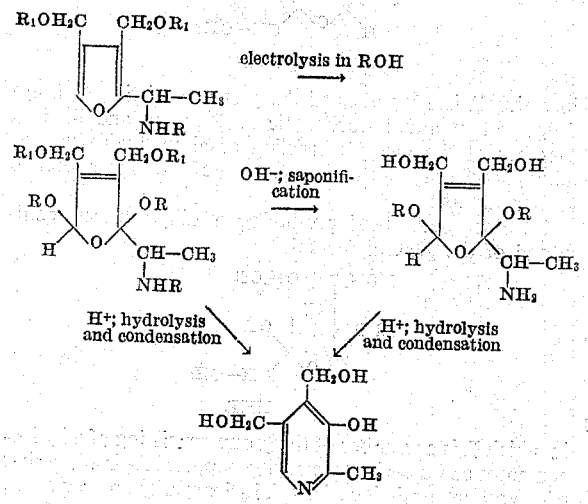

in which R and $R_1$ have the meanings previously ascribed. The product obtained after the electrolysis may, as pointed out earlier, be a mixture of compounds which in the 3- and 4-positions have methoxy groups which either are not acylated at all or are partially or wholly acylated, as either one or both acyl groups may be split off by alcoholysis during the electrolysis.

The reaction scheme shows that when an acid medium is used pyridoxine may be obtained directly from the oxidation product without isolating the same, although this method yields a less pure pyridoxine.

Likewise, when the oxidation is carried out employing chlorine or bromine with the starting material in alcoholic solution, as described earlier, it is not necessary to isolate an intermediate product in forming pyridoxine. The resulting product may be hydrolyzed to form pyridoxine, as already described for the electrolysis product, either with or without a preceding saponification, said hydrolysis and saponification being carried out in the manner set forth above. Thus, it is possible to proceed as follows: After evaporation of the mixture in vacuo and addition of a solvent to precipitate the resultant inorganic salt, for instance the potassium bromide, which is formed when bromine is used as the oxidizing agent, this salt is removed and then a sodium hydroxide solution is added, the mixture thereafter being refluxed, preferably for about 10–30 hours, and the reaction mixture then being further treated as described above. In this manner pyridoxine is obtained.

According to another embodiment of the invention, the oxidation is performed with chlorine or bromine in an aqueous alcohol, preferably methanol, containing for instance from 10 to 80% and preferably from 30 to 60% water, at about or below room temperature and preferably at a temperature between 0° and —80° C., and most preferably between —10° and —30° C., for a short period of time (5–30 minutes). More water is then added (about 40–60%, calculated on the volume of the reaction mixture), and the mixture is boiled for a short time (3–20 minutes), whereupon it is evaporated to dryness. After crystallization from anhydrous or almost anhydrous ethanol, pyridoxine hydrochloride is obtained directly, i. e. without isolation of any intermediate product.

This last-mentioned oxidation procedure is preferably carried out by using as starting material the 2-(α-aminoethyl)-3,4-bis(hydroxymethyl)-furan which is obtained directly by reductive amination of 2-acetyl-3,4-bis(hydroxymethyl or acyloxymethyl)furan; in this case the hydroxy groups and the amino group do not require protection.

The invention is illustrated further by the following examples:

*Example 28.*—2.55 gm. (0.0086 mol) of 2-(α-acetamidoethyl)-3,4-bis(acetoxymethyl)-furan were mixed with a solution of sodium methoxide (produced from 0.415 gm. (0.018 mol) of sodium in 11 ml. of methanol). The mixture was refluxed overnight. Then, a solution of 72 mg. (0.0012 mol) of acetic acid in 1 ml. of methanol was added, and the solution was cooled to —20° C., whereupon it was treated with a solution of 0.43 ml. (0.0086 mol) of bromine in 9 ml. of methanol as described in Example 17. After an evaporation without any preceding ether treatment the residue obtained was treated directly as described in Example 21 and then produced 0.55 gm. of pyridoxine hydrochloride melting at 207–209° C. (decomposition), and 0.14 gm. pyridoxine hydrochloride melting at 205–207° C. (decomposition), the total yield thus amounting to 0.69 gm. (39%).

*Example 29.*—1.93 gm. (0.011 mol) of 2-(α-aminoethyl)-3,4-bis(hydroxymethyl)-furan were dissolved in a mixture of 4 ml. of methanol and 5 ml. of water. The mixture was cooled, and 0.4 ml. of chlorine measured at —80° C. (0.011 mol) were added within 5 minutes at a temperature of from —50° to —80° C. 5 ml. of water were added to the reaction mixture, and the weakly yellow mixture was boiled in an open vessel for 10 minutes, whereupon it was evaporated in vacuo to dryness. Crystallization from 99% ethanol gave 1.25 gm. of pyridoxine hydrochloride melting at 208–210° C. (decomposition). From the mother liquor another 0.09 gm. of pyridoxine hydrochloride was recovered and melting at 204–207° C. (decomposition), the total yield thus amounting to 1.34 gm. (58%).

We claim:

1. A method of producing vitamin $B_6$ (pyridoxine), comprising aminating by treatment with a compound selected from the group consisting of ammonia, hydroxylamine and salts thereof and with hydrogen the keto group located in the α-position in the substituent in the 2-position of the furan ring of a compound having the general formula

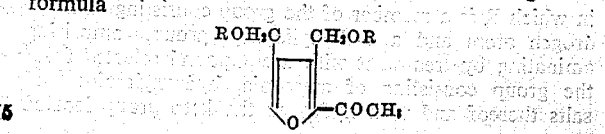

in which R is a member of the group consisting of a hydrogen atom and a carboxylic acyl group to produce a furan compound having the general formula

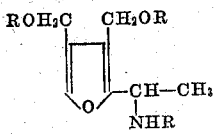

in which R has the same meaning as above, and reacting the last-named compound under oxidizing conditions with an alcohol R₁OH in which R₁ is a member of the group consisting of alkyl, hydroxyalkyl, alkoxyalkyl, and cycloalkyl groups of not more than 6 carbon atoms, and hydrolyzing the resulting product at a pH at least as low as 7 to form pyridoxine.

2. The process of claim 1 in which the said keto group is aminated by treatment with gaseous hydrogen and ammonia in the presence of a catalyst.

3. The process of claim 1 in which the said keto group is aminated by reduction with gaseous hydrogen in methanol in the presence of ammonia and Raney nickel as a catalyst under a pressure of 100–200 atmospheres and at a temperature of 120°–175° C.

4. The process of claim 1 in which the said oxidizing conditions are produced chemically at a low temperature by means of a halogen selected from the group consisting of chlorine and bromine.

5. The process of claim 1 in which the said oxidizing conditions are produced chemically at a temperature of from −10° C. to −80° C. by means of a halogen selected from the group consisting of chlorine and bromine in an anhydrous alcohol solution.

6. The process of claim 1, in which the said oxidizing conditions are produced chemically at a temperature of from −10° C. to −80° C. by means of a halogen selected from the group consisting of chlorine and bromine in an aqueous alcohol solution.

7. The process of claim 1, in which the said oxidizing conditions are produced chemically at a temperature of from −10° C. to −80° C. by means of chlorine in aqueous methanol solution.

8. The method of claim 7, in which additional water is added after the reaction and prior to hydrolysis.

9. Compounds of the general formula

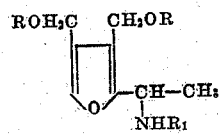

in which R and R₁ are each a member of the group consisting of a hydrogen atom and a carboxylic acyl group and acid addition salts of said compounds in which R₁ is a hydrogen atom.

10. 2 - (α - acetamidoethyl) - 3,4-bis(acetoxymethyl)-furan.

11. 2 - (α - aminoethyl) - 3,4 - bis-(hydroxymethyl)-furan.

12. 2 - (α - aminoethyl) - 3,4 - bis-(hydroxymethyl)-furan hydrochloride.

13. The method of producing a furan compound having the general formula

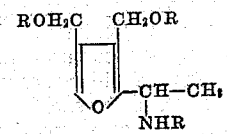

in which R is a member of the group consisting of a hydrogen atom and a carboxylic acyl group, comprising aminating by treatment with a compound selected from the group consisting of ammonia, hydroxylamine and salts thereof and with hydrogen the keto group located in the α-position in the substituent in the 2-position of the furan ring of a compound having the general formula

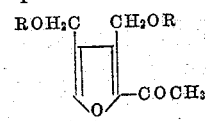

in which R is a member of the group consisting of a hydrogen atom and a carboxylic acyl group.

14. The process of claim 13, in which the said keto group is aminated by treatment with hydrogen and ammonia in the presence of a catalyst.

15. The process of claim 13, in which the said keto group is aminated by reduction with gaseous hydrogen in methanol in the presence of ammonia and Raney nickel as a catalyst under a pressure of 100–200 atmospheres and at a temperature of 120°–175° C.

16. The process of claim 14, in which the reaction product is acylated.

17. The process of claim 13, which comprises reacting the keto group with a compound selected from the group consisting of hydroxylamine and its salts to form the oxime, and thereafter reducing the said oxime with hydrogen to form a

group.

18. A dihydrofuran compound of the general formula

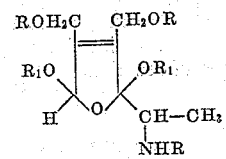

in which R is a member of the group consisting of a hydrogen atom and a carboxylic acyl group, and R₁ is a member of the group consisting of alkyl, hydroxyalkyl, alkoxyalkyl, and cycloalkyl groups of not more than 6 carbon atoms.

19. The method of producing a dihydrofuran compound of the general formula

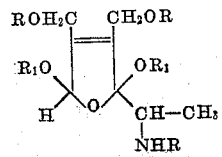

in which R is a member of the group consisting of a hydrogen atom and a carboxylic acyl group, and R₁ is a member of the group consisting of alkyl, hydroxyalkyl, alkoxyalkyl, and cycloalkyl groups of not more than 6 carbon atoms, comprising reacting under oxidizing conditions a compound having the general formula

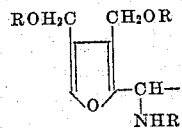

in which R is a member of the group consisting of a hydrogen atom and a carboxylic acyl group with an alcohol having the formula R₁OH in which R₁ has the above meaning.

20. The method of claim 19, in which the dihydrofuran compounds formed by the reaction are saponified in an alkaline medium.

21. The method of claim 19, in which the oxidizing conditions are produced electrolytically in the presence of an electrolyte soluble in the alcohol.

22. The method of claim 21, in which the alcohol is methanol, the electrolyte is ammonium bromide and the electrolysis is carried out at a temperature between 0° and —30° C. at a terminal voltage of from 3 to 20 volts and a current strength of from 0.1 to 10 amperes.

23. A method of producing pyridoxine comprising hydrolyzing at a pH at least as low as 7, to form a pyridine ring by condensation, a dihydrofuran compound of the general formula

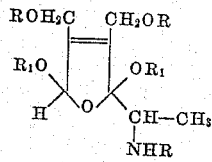

in which R is a member of the group consisting of a hydrogen atom and a carboxylic acyl group, and $R_1$ is a member of the group consisting of alkyl, hydroxyalkyl, alkoxyalkyl, and cycloalkyl groups of not more than 6 carbon atoms.

24. The method of claim 23, in which prior to hydrolysis the said compound is saponified in an alkaline medium to form 2-($\alpha$-aminoethyl)-3,4-bis(hydroxymethyl)-2,5-di-$R_1$O-2,5-dihydrofuran wherein $R_1$ is a member of the group consisting of alkyl, hydroxyalkyl, alkoxyalkyl, and cycloalkyl groups of not more than 6 carbon atoms.

References Cited in the file of this patent
UNITED STATES PATENTS

| | | |
|---|---|---|
| 2,520,037 | Cohen | Aug. 22, 1950 |
| 2,527,421 | Hofmann | Oct. 24, 1950 |

OTHER REFERENCES

Williams et al.: J. Org. Chem., August 1955, page 1139.
Gilman et al.: J. Am. Chem. Soc., vol. 57, pp. 907–8 (1935).